July 9, 1968 W. E. BRIGHAM 3,391,636
INTERCHANGEABLE INKING UNIT FOR MULTICOLOR PRESSES
Original Filed June 3, 1963 10 Sheets-Sheet 1

INVENTOR.
WARD E. BRIGHAM
BY
Fisher, Christen, Sabol & Caldwell
ATTORNEYS

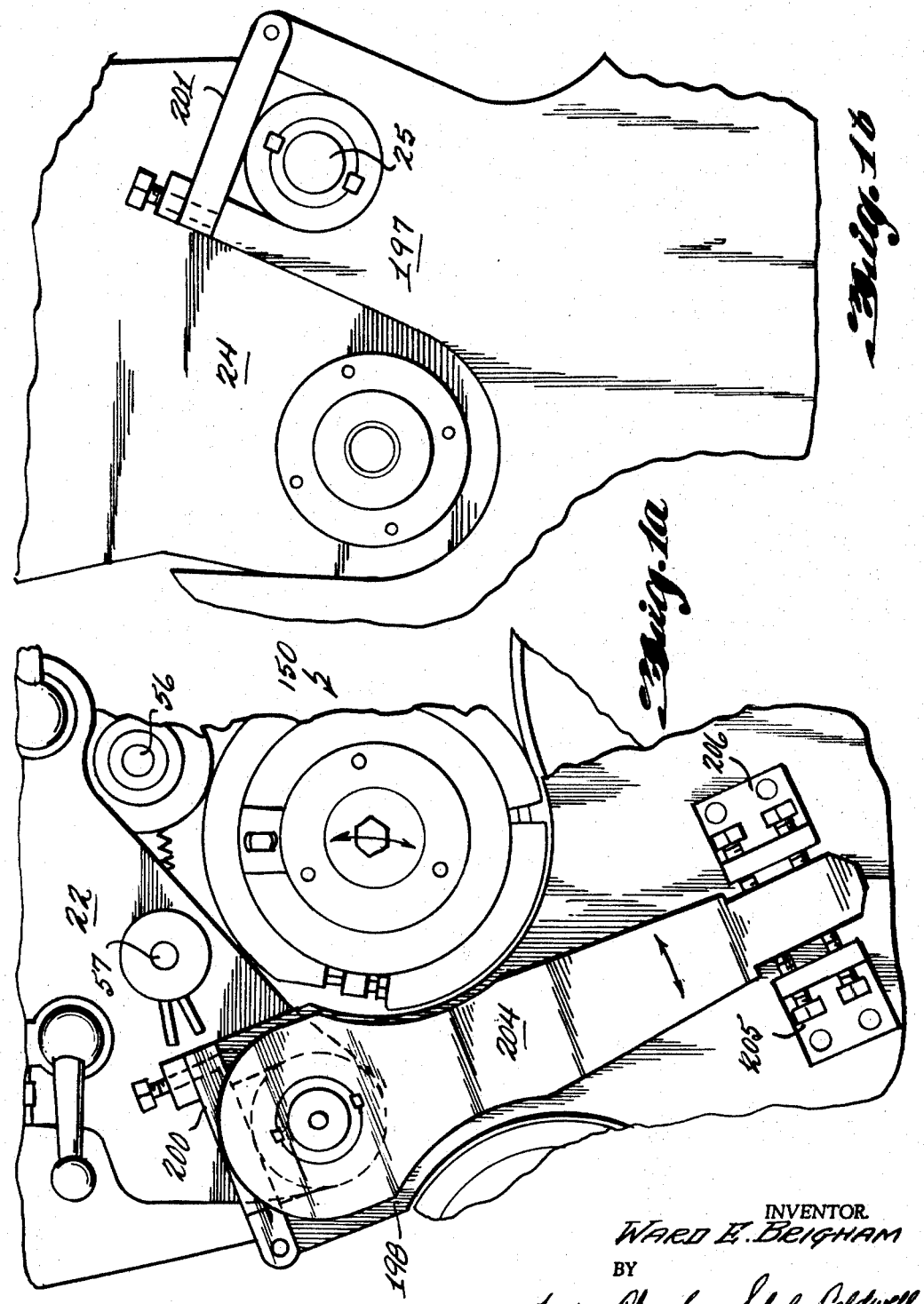

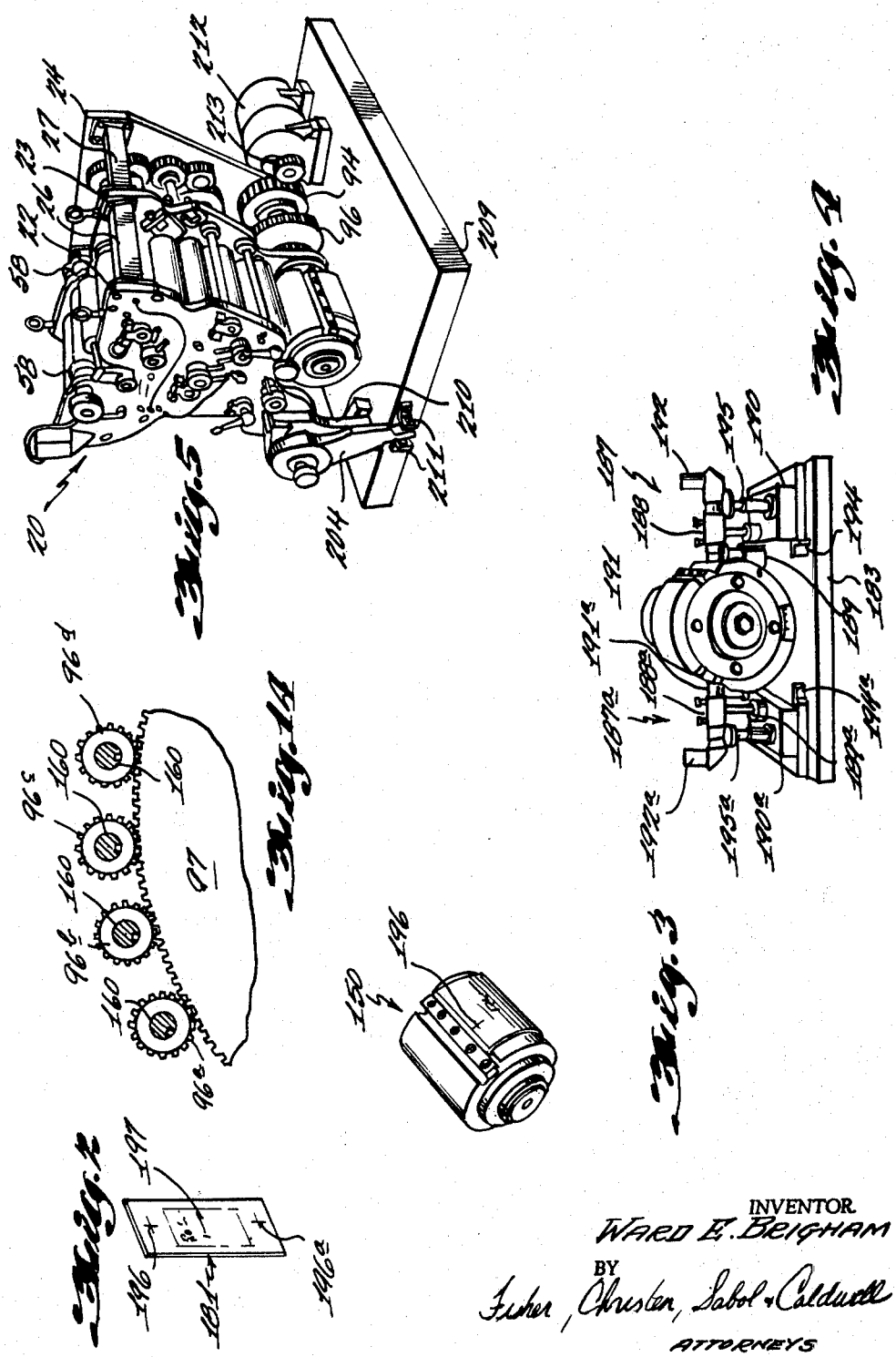

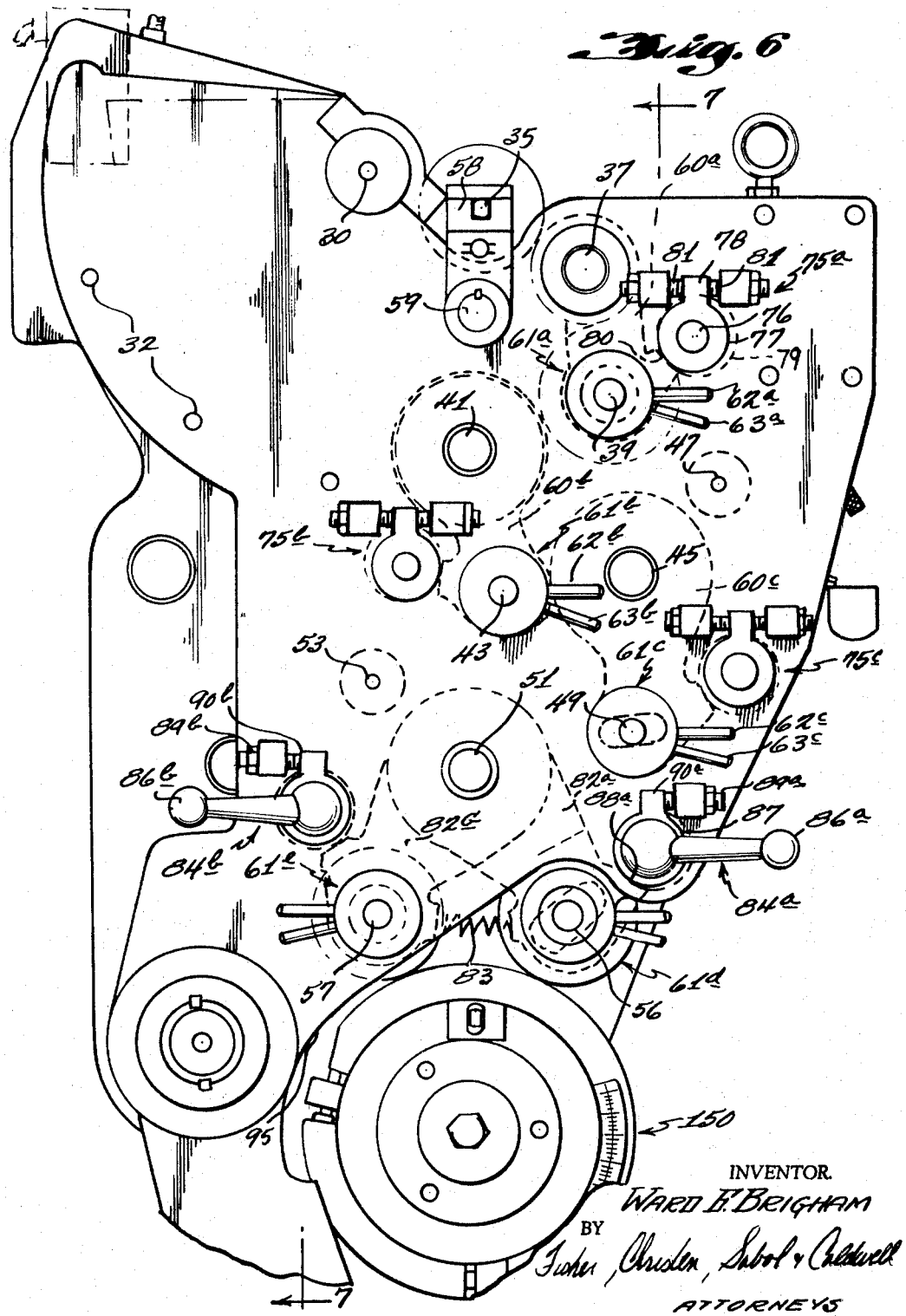

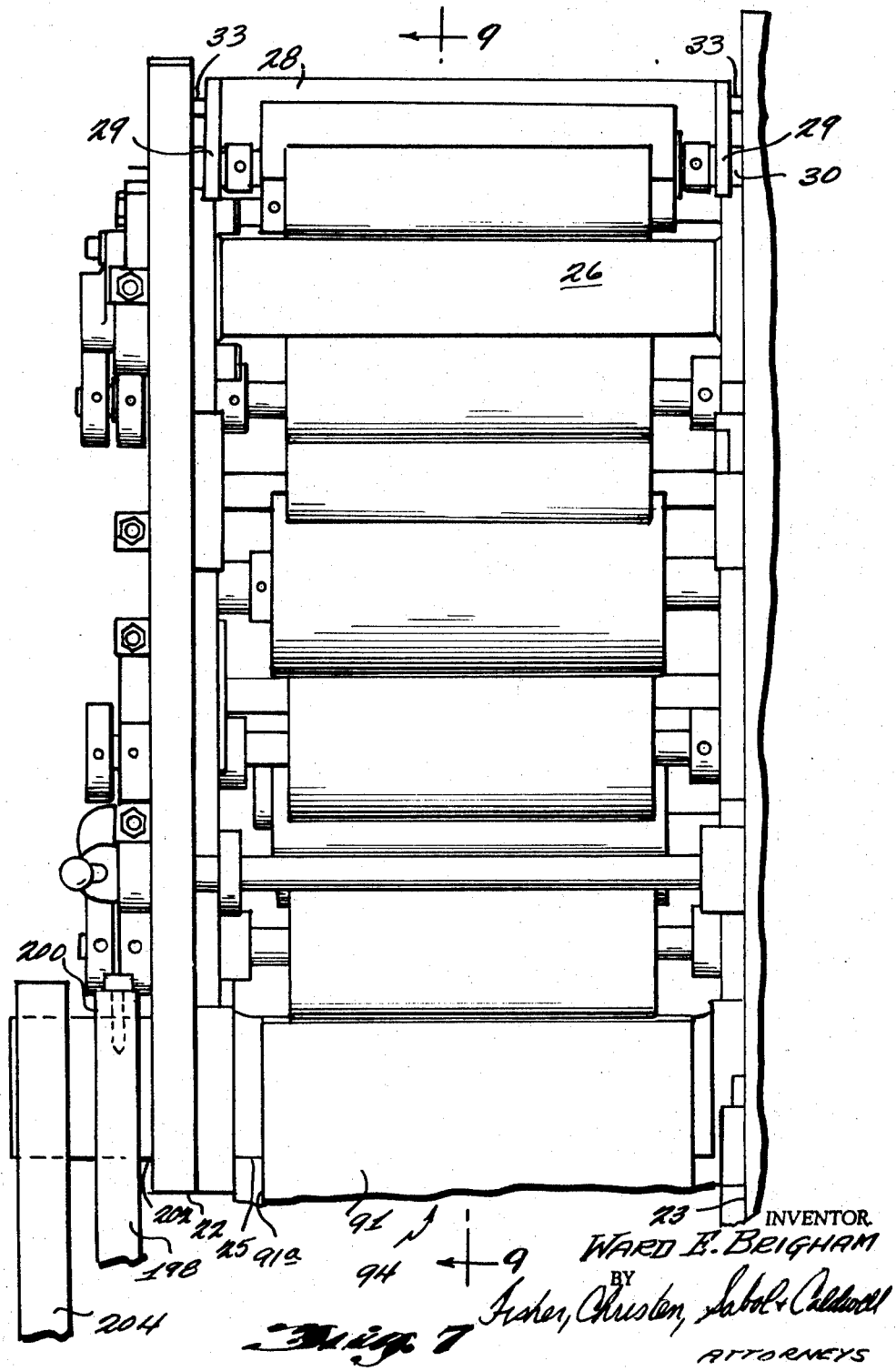

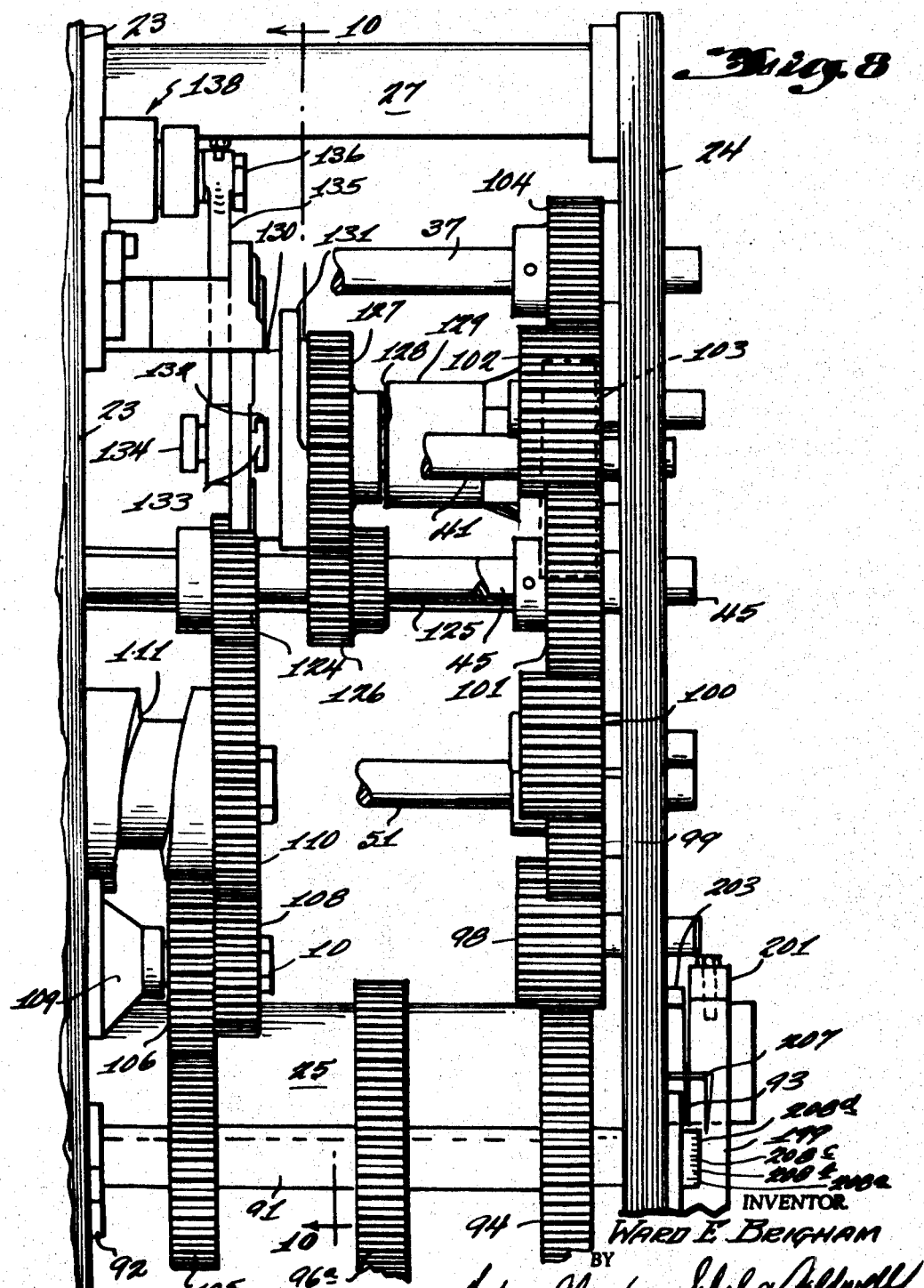

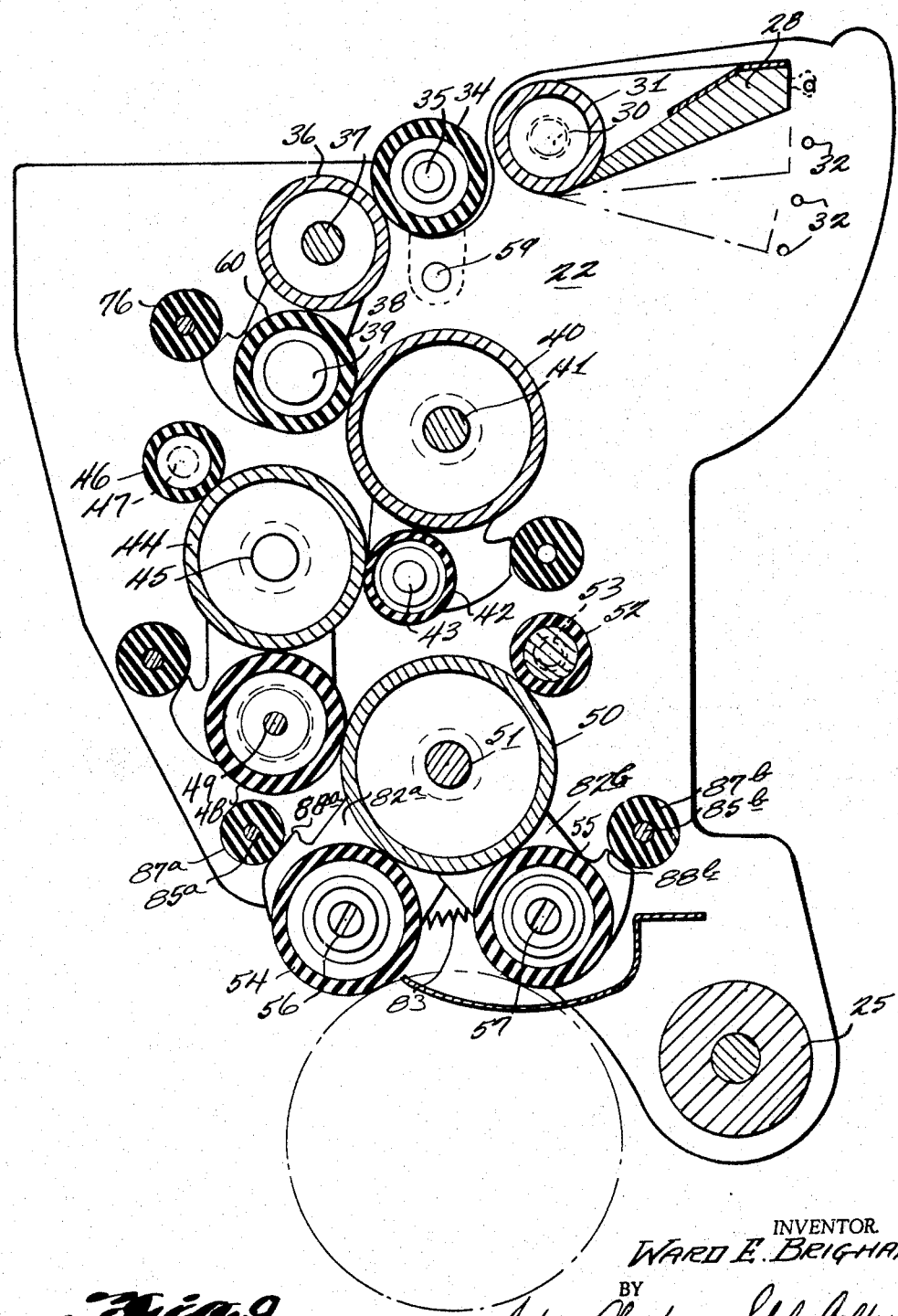

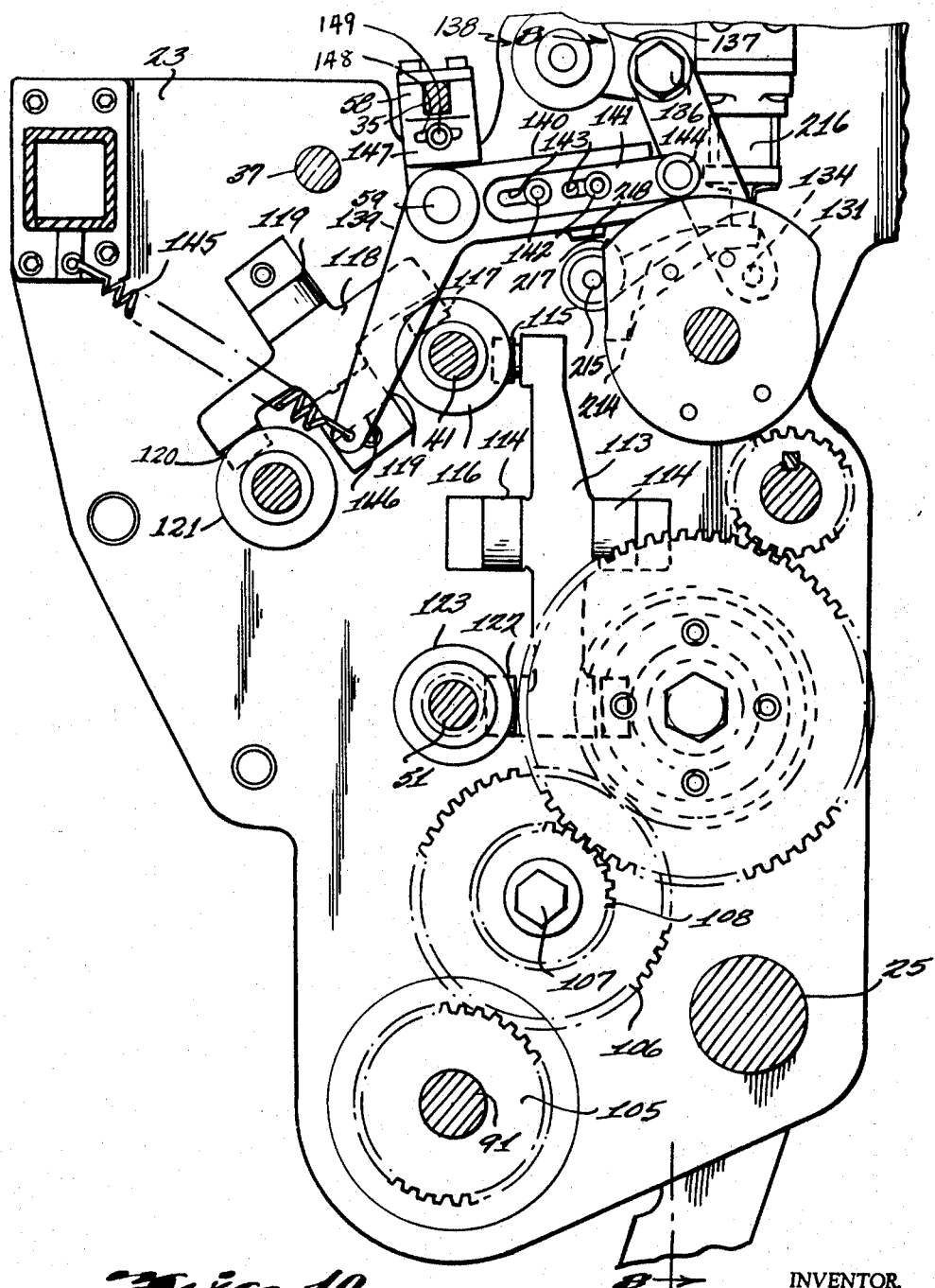

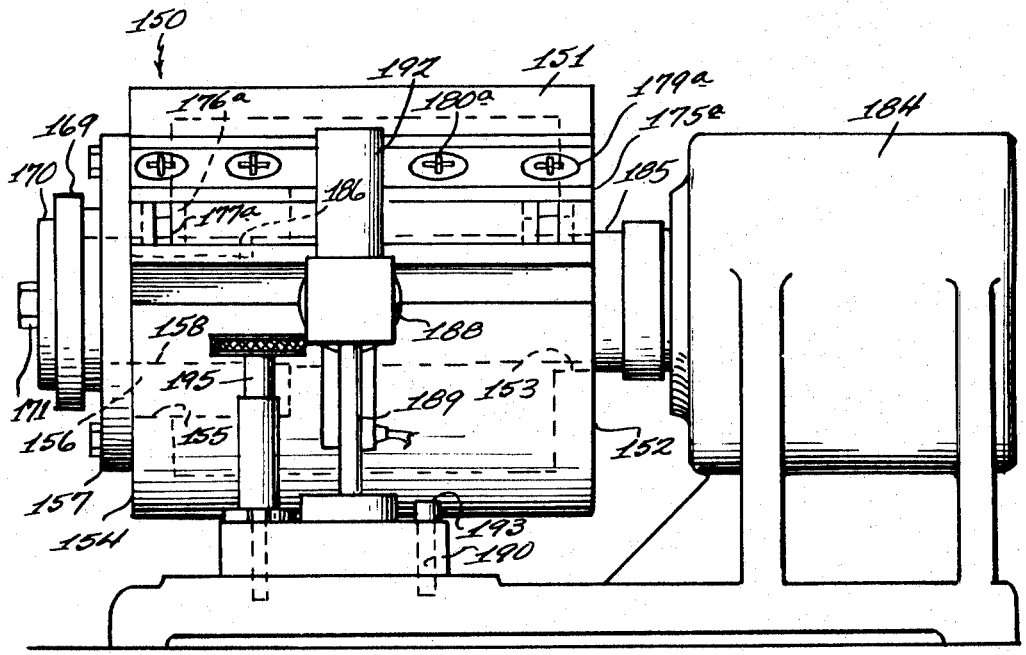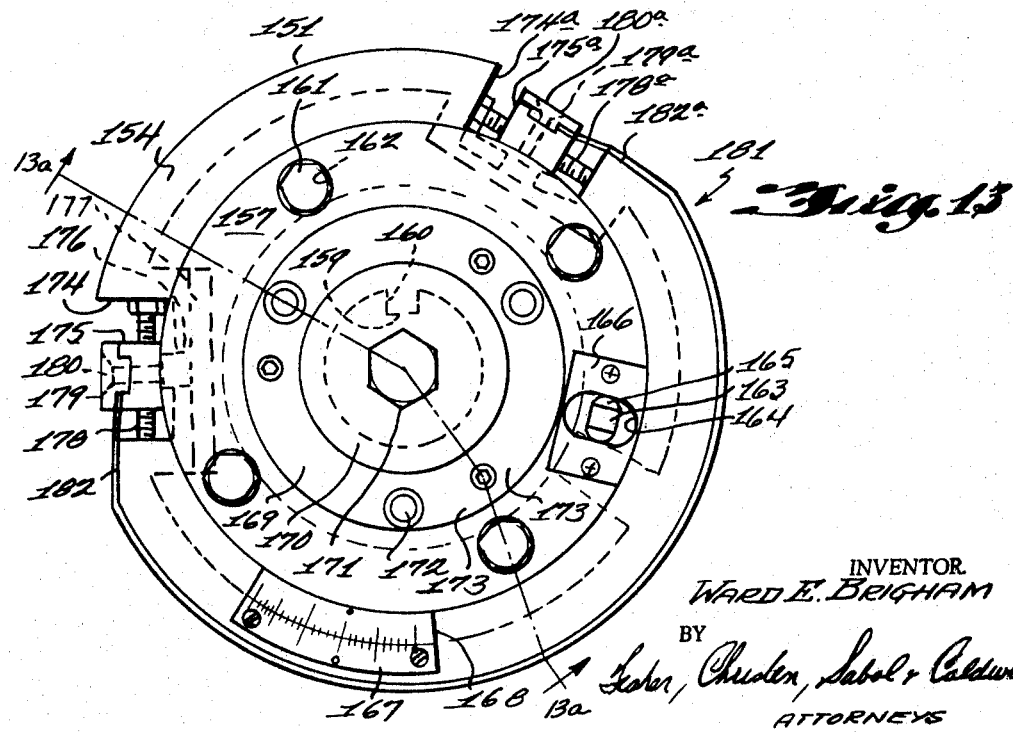

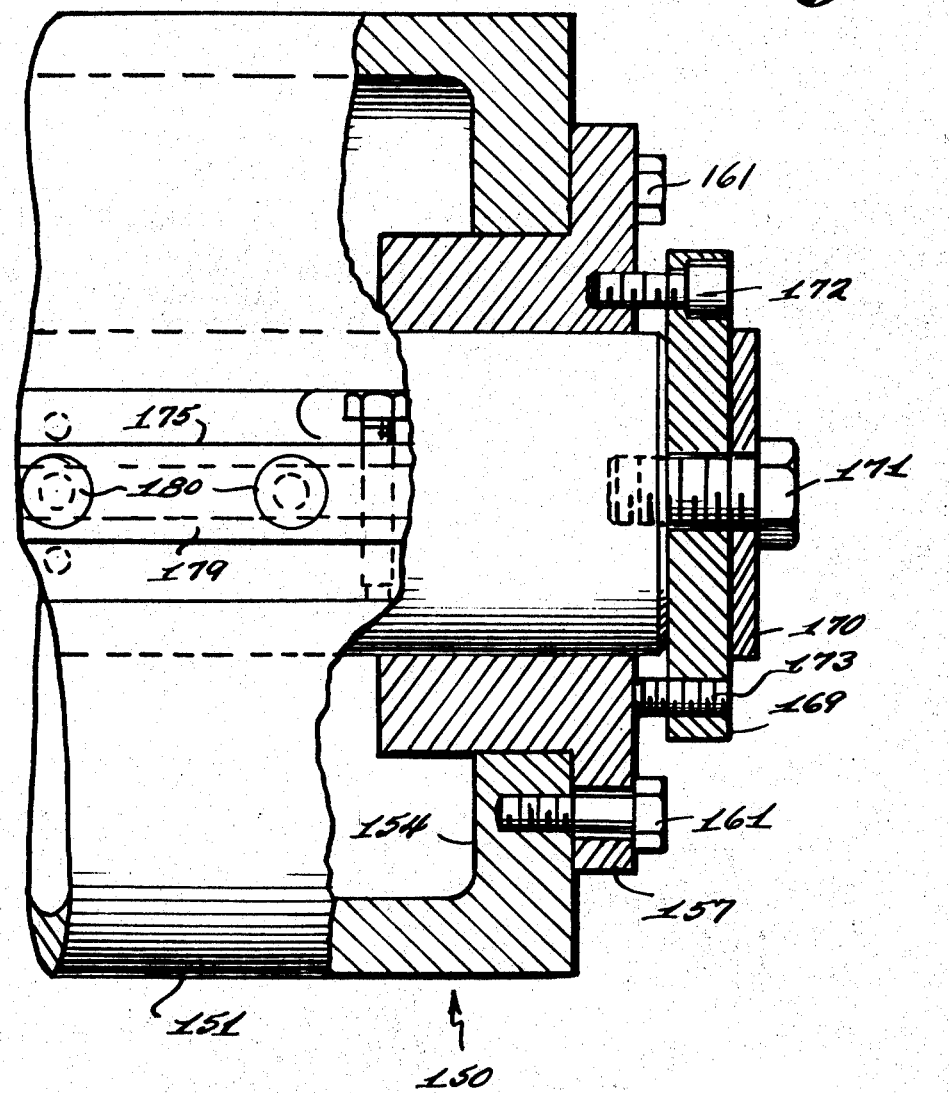

United States Patent Office 3,391,636
Patented July 9, 1968

3,391,636
INTERCHANGEABLE INKING UNIT FOR MULTICOLOR PRESSES
Ward E. Brigham, Rutherford, N.J., assignor to Sun Chemical Corporation, New York, N.Y., a corporation of Delaware
Original application June 3, 1963, Ser. No. 284,868, now Patent No. 3,223,028, dated Dec. 14, 1965. Divided and this application Aug. 19, 1965, Ser. No. 489,457
2 Claims. (Cl. 101—248)

ABSTRACT OF THE DISCLOSURE

A preregistry stand includes a shaft support for a printing cylinder with circumferential and axial reference points, and a plate cylinder is removably supported on the stand for preregistry of a plate thereon. The cylinder with the plate attached is movable axially and circumferentially as a unit and, when adjusted, can be removed as a unit and attached to the shaft of the press.

---

This application is a division of my copending application, Ser. No. 284,868, filed June 3, 1963, for an "Interchangeable Inking Unit for Multicolor Presses" now Patent No. 3,223,028, granted Dec. 14, 1965.

In the conventional multicolor printing presses in use today where a number of printing plates have been prepared from color separation negatives, each of which plates is to produce only a single color impression in registry with a plate or plates producing an impression in another color, the plate cylinders are mounted on the press and the impression plate can only be attached to and removed from these cylinders while the press is idle. In addition, all adjustments for securing registry of the various plates must also be done on the press.

Furthermore, if a change is to be made, such as the substitution of one or more of the plates, or a change in the color to be printed by any one of the plates, the press must be shut down and the entire operation involved in the substitution or change must be done on the press while it is stopped.

It is, therefore, one of the objects of the present invention to provide means whereby a plurality of printing plates intended to produce a single composite impression may be mounted on the respective plate cylinders in preregistered relationship so that when the cylinders are put on the press, substantially no further adjustments will be necessary.

It is a further object of the invention to provide removable inker feed units for the separate colors of a multicolor press, these inker units including mounting means and registry mechanisms for the printing plate and plate cylinder whereby all necessary adjustments may be made prior to assembling the inker units on the press.

Another object of the invention is to provide novel mounting means for the various rolls of a printing press inker unit which will permit adjustment of the relative positions of the rolls to be made on one side of the unit.

Still another object is to provide a novel preregistry jig for positioning printing plates on a printing cylinder prior to mounting the cylinder on a press.

A still further object is to provide a set-up stand for mounting a removable inker unit for a printing press so that adjustments of the roll mechanism and plate cylinder may be carried out prior to attaching the inker unit to a press.

Yet another object is to provide means for a continuously operating printing press which will stop the flow of ink to a printing cylinder whenever there is an interruption in the feed of articles to be printed.

Other objects and advantages will be evident to those skilled in the art after reading the following specification in connection with the annexed drawings, in which:

FIG. 1a is a detail view of the front mounting of an inker unit;

FIG. 1b is a detail view of the rear mounting of an inker unit;

FIG. 2 is a perspective view of a printing plate prior to attachment to the cylinder;

FIG. 3 is a perspective view of a printing cylinder with the plate attached;

FIG. 4 is a perspective view of a preregistry mechanism constructed in accordance with this invention for adjusting the printing plate on the printing cylinder;

FIG. 5 is a perspective view from the operator's side of one of the ink fountains shown in FIG. 1, but mounted on a stand for adjusting preregistry of the printing plate;

FIG. 6 is a front elevation of the removable ink feeder on a greatly enlarged scale and with the lower portion of the adjusting leg broken away;

FIG. 7 is a rear elevation of the left half of the ink fountain shown in FIG. 6;

FIG. 8 is a rear elevation of the right-hand side of the ink fountain taken along the line 8—8 of FIG. 10, with portions of the mechanism broken away;

FIG. 9 is a cross-sectional elevation taken along the line 9—9 of FIG. 7;

FIG. 10 is a cross-sectional elevation taken along the line 10—10 of FIG. 8;

FIG. 12 is an end elevation of the preregister mechanism shown in FIG. 3, but on an enlarged scale;

FIG. 13 is an end view of the printing cylinder shown in FIG. 12 showing the adjustment for registering the printing plate;

FIG. 13a is an enlarged detail, partly in section, of the front end of a plate cylinder mounting; and FIG. 14 is a fragmentary view in elevation of the main drive gear of a printing press in engagement with the driving gears of a series of ink feeders illustrating the manner of obtaining interchangeable preregistry of the printing plates.

Figure 1:
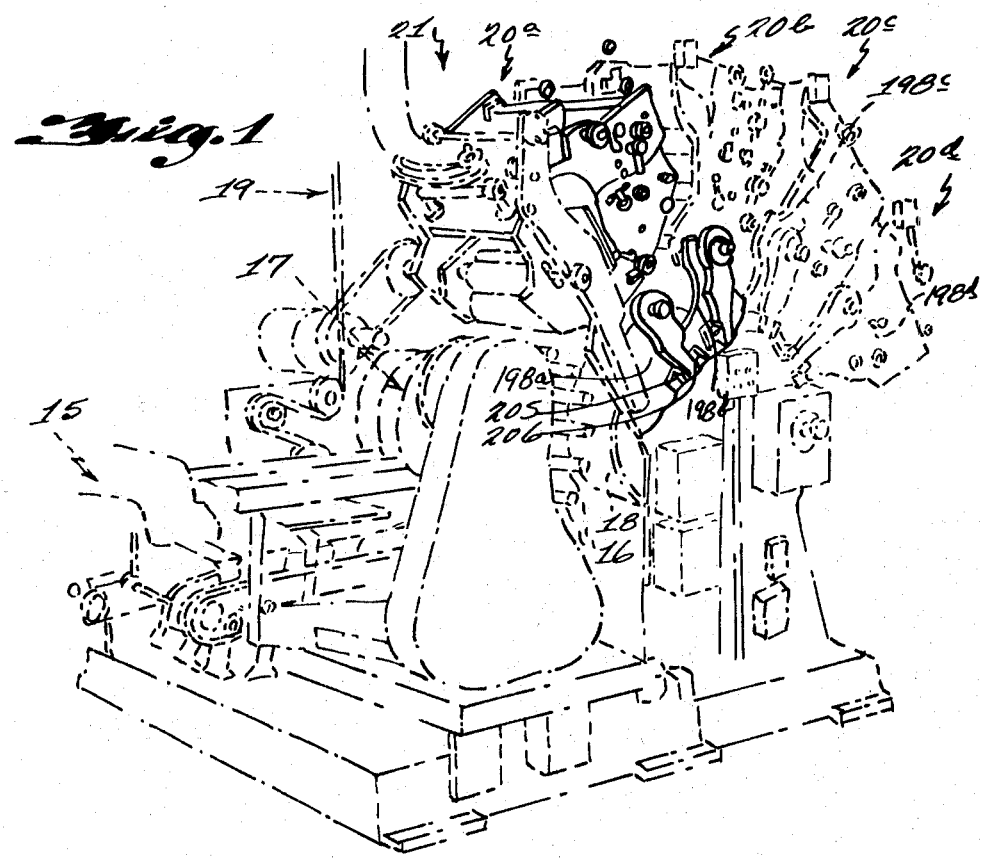
FIG. 1 is a perspective view of a multicolor press machine for decorating tubular articles, provided with removable and interchangeable ink fountains constructed in accordance with this invention.

Turning now to the drawings in detail, there is shown in FIG. 1, a mechanism for decorating tubular articles such as metal cans, plastic tubes, and so forth, having a feeding mechanism indicated generally by the numeral 15, which delivers the articles to a series of horizontally arranged spindles 16, mounted on a carrier mechanism for movement in a circular path about a horizontal axis by a carrier mechanism indicated generally by the numeral 17 for momentary engagement with the rotating printing blanket 18, after which the cans are delivered to a conveyor means indicated generally by the numeral 19, which delivers them to a baking oven (not shown).

The press mechanism generally is described and claimed in Patent No. 3,227,070, granted to Ward E. Brigham, Robert L. Eckert and Clarence K. MacKenzie, on Jan. 4, 1966, which is a continuation-in-part application of application, Ser. No. 56,437, filed on Sept. 16, 1960, now abandoned.

The present invention relates to the means whereby a composite multicolor ink impression is transferred to the printing blanket 18 by a series of inked printing plates, each of which delivers a single color impression on the printing blanket by the offset process; the individual printing cylinders being arranged sequentially about the periphery of the printing blanket in such a manner that each of the cylinders may be removed and replaced at will without destroying the registry of the impression to be produced on the printing blanket.

In accomplishing the objects of this invention, a series of identical, interchangeable, and removable ink fountains, indicated generally by the numeral 20, as shown in FIG. 5, are provided. These ink feeders include an ink fountain for a single color and the usual roller mechanisms for delivering this color to a printing plate mounted on a cylinder, all of the various mechanisms being capable of adjustment on a stand, such as is shown in FIG. 5, prior to its mounting on the press. As shown in FIG. 1, four of these feeders indicated generally by numerals 20a, 20b, 20c and 20d, are shown together with a final varnishing attachment, indicated generally by the numeral 21. Since all of the feeders are identical in construction, it will only be necessary to describe one of them in detail.

The ink feeder mechanism has a framework composed of three horizontally spaced irregularly shaped vertical supporting walls 22, 23 and 24, which are joined together at their forward lower ends by a heavy cylindrical bracing member 25, and at their upper portions by horizontal bracing members 26 and 27.

The ink fountain 28 is horizontally supported between the frame members 22 and 23 by means of forwardly projecting brackets 29, rotatably mounted on horizontal shaft 30 extending between supports 22 and 23, which also supports the fountain roller 31. This arrangement permits the fountain to be tilted up and down about a horizontal axis so as to be positioned in a horizontal plane regardless of the angle of tilt assumed by the feeder as a whole depending upon its location on the press. A series of openings 32 are provided in the adjacent walls 22 and 23 to receive the outwardly directed spring-biased horizontally slidable positioning pins 33 attached to the rearward sides of the ink fountain. Ink is transferred from the fountain roller 31 to the printing plate through the usual mechanisms which include: a reciprocatory ductor roller 34 mounted on shaft 35, fixed steel roller 36 on shaft 37, distributor roller 38 mounted on shaft 39, vibrating drum 40 mounted for axial reciprocatory movement on shaft 41, distributor roller 42 on shaft 43, vibrating drum 44 on axially movable shaft 45, which is also engaged by a rubber rider roller 46 on shaft 47. Ink then passes to the distributor roller 48 on shaft 49, to the vibrating drum 50 which is axially movable on shaft 51 and also in contact with another rider roller 52 on shaft 53, and, finally, the ink is transferred to the form rollers 54 and 55, mounted respectively on shafts 56 and 57.

The shaft 35 for the ductor roller is supported at its ends by brackets 58 which, in turn, project upwardly from, and are fixed to, a shaft 59 which extends between the supports 22 and 23 and is oscillated by a mechanism which will be described later. The shafts 30 and 37 are supported by fixed bearings (not shown) and, in addition, shaft 37 rotatably supports a pair of downwardly projecting hangers 60 which movably support the distributor roller 38 on shaft 39.

Figure 11:
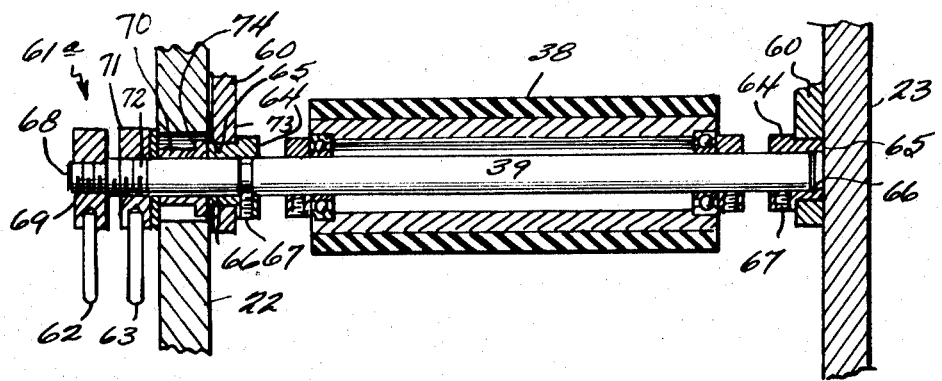
FIG. 11 is a longitudinal cross-section through one of the distributor rolls showing an arrangement for adjusting the position of the roll from one side of the ink feeder mechanism.

Shaft 39 is supported by the lower ends of these hangers by an adjustable positioning mechanism indicated generally by the numeral 61a, which is shown in detail in FIG. 11. The shaft projects forwardly through an enlarged opening in the support 22 and is provided with a pair of adjustment levers 62 and 63 for adjusting the position of both ends of the shaft from the front side of the ink feeder.

Turning to FIG. 11, it will be seen that the adjustable positioning mechanism 61a is constructed as follows: At the inner end of the shaft 39, a cylindrical bushing 64 is rotatably received within a circular opening 65 in the hanger 60. The shaft itself, however, is received within an eccentrically positioned bore 66 within the bushing and is secured to the bushing as by means of the set screw 67.

Also secured near the forward end of the shaft 39 is another bushing 64 which is received in the circular opening 65 in the hanger while the shaft passes through an eccentrically positioned bore 66; the bushing being secured to the shaft by means of set screw 67 as was the case at the other end of the shaft.

It will therefore be evident that rotation of the shaft 39 will vary its axis with respect to the axis of the shaft 37 from which the hanger 60 depends. This rotation of the shaft may be accomplished by the lever 62 which is threadedly secured to a reduced portion 68 at the forward end of the shaft as by means of the internally threaded collar 69.

Once the correct position of the shaft has been obtained, it can be locked in place by means which include the collar 71 on which is secured the lever 63. The collar 71 is threadedly received on a portion 72 of the shaft adjacent the reduced portion 68. Bushing 64 is provided with a flange 73 which abuts one side of the hanger 60 while the bushing 70 is provided with a flanged portion 74 which abuts against the other side of the hanger. The length of bushing 64 is slightly less than the thickness of the hanger so that when the collar 71 is tightened down on the shaft 39, the flanges of the two bushings will firmly grip the opposite sides of the hangar to prevent further rotation of the shaft. Obviously, when it is desired to change the position of the shaft, all that is necessary is to unscrew the collar 71 to loosen the bushing, after which, the bushings themselves may be rotated by the shaft by turning the lever 62.

The position of the hangers 60 is also capable of adjustment in order to change the position of the shaft 39 with respect to the shaft 41, and thereby vary the pressure exerted by the distributor roll 38 against the vibrating drum 40. This adusting means is indicated generally by the numeral 75.

This adjusting means includes a shaft 76 extending between walls 22 and 23 and extending outwardly in front of the support 22, at which end it is provided with a collar 77 having a radially projecting lug 78. Shaft 76 is also provided with a pair of symmetrically arranged eccentrics 79, each of which is positioned in alignment with one of the hangers 60 and is arranged in sliding engagement with a laterally projecting boss 80 thereon.

It will be evident that rotation of the shaft 76 will swing the hangers 60 toward and away from the vibrating drum and once the correct position has been obtained, the shaft can be set by means of the threaded adjustment bolts 81 positioned for engagement with opposite sides of the lug 78. The distributor roller shafts 43 and 49 are similarly suspended from the shafts 41 and 45 by means of hangers 60b and 60c, respectively, and are adjustably positioned in these hangers by positioning means 61b and 61c, respectively, which are similar in construction with the positioning means 61a, and are respectively provided with adjustment levers 62b, 63b and 62c and 63c, respectively.

The hangers 60b are also adjustable to change the pressure of distributor roller 42 against vibrating drum 44 by means of the hanger adjustment indicated generally by the numeral 75b, which is similar in construction to the adjustment previously described and indicated by the numeral 75a.

The pressure of distributor roller 48 upon the vibrating drum 50 can also be adjusted by means of the hanger adjustment means, indicated generally by the numeral 75c, which also acts upon the hangers 60c in a manner similar to that of the adjustment 75a.

The form roller shafts 56 and 57 are respectively suspended by pairs of hangers 82a and 82b from shaft 51; one pair of these hangers being positioned axially inwardly of the other pair, while the shafts themselves are eccentrically mounted in the hangers by means of positioning means 61d and 61e, respectively, similar to the eccentric positioning means 61a.

A compression spring 83 extends between the lower ends of these hangers with its opposite ends respectively secured one to each hanger for the purpose of urging the hangers in a direction to spread them apart. Throw-off mechanisms 84a and 84b are also provided for the hangers. These mechanisms include shafts 85a and 85b extending between the supports 22 and 23 and having operating handles 86a and 86b accessible from the front side of the support 22. As was the case with the previously described hanger adjustment 75a, a pair of eccentrics 87a are provided at opposite ends of shaft 85a for sliding contact with the bosses 88a provided on hangers 82a, and shaft 85b is provided with eccentrics 87b to engage with the bosses 88b on the hangers 82b.

A single threaded stop 89a is provided on the front side of support 22 for engagement with lug 90a to adjustably limit rotation of shaft 85a in a clockwise direction, as viewed in FIG. 6. A similar stop mechanism 89b and lug 90b are provided for shaft 85b to limit rotation of this shaft in a counterclockwise direction.

It will be understood that the bosses will be maintained in contact with the eccentrics as a result of the outward pressure exerted by the spring 83 on the hangers. It should also be understood that the eccentrics should be arranged so that when the lugs on the throw-out mechanisms are engaged with their respective stops (as shown in FIG. 6) the ink forms will be suitably adjusted for transferring ink to a printing plate and that when the operating levers 86a and 86b are moved respectively in counterclockwise and clockwise positions, the eccentrics will be moved to position their low spots into engagement with the hanger bosses to permit the form rollers to move upwardly and out of contact with a printing plate; the form rollers at all times remaining in contact with the vibrating drum 50 with which they are associated.

Power to operate the various mechanisms is supplied through the main plate cylinder shaft 91, which is mounted on the vertical supports 23 and 24 by preloaded antifriction bearings 92 and 93. The forward end of this shaft removably supports the plate cylinder assembly 150 in a manner which will be explained later in detail, and the lower portion 95 of the front support is cut away to permit the plate cylinder to be attached to and removed from the shaft.

A main drive gear 96a of the conventional spring-loaded antibacklash type is secured at a midpoint to the shaft 91 which, when the ink feeder is in place on the press, will engage with the large drive gear 97 which turns with the blanket roll, as is shown in FIG. 14. Another gear 94 at the rear end of shaft 91 meshes with an idler 98 which, in turn, engages with gear 99, secured to shaft 51. This gear, in turn, engages with another idler 100 to drive gear 101 fixed on shaft 45. This gear then drives idler 102 which, in turn, meshes with a gear 103 on shaft 41 and also a gear 104 secured to shaft 37.

Secured to another part of the shaft 91 is another gear 105 meshing with a gear 106 which is secured to a stub shaft 107, to which is also secured a smaller pinion gear 108. The shaft 107 is rotatably mounted in a pedestal 109 attached to the rear side of supporting member 23. A pinion 108 drives a gear 110 which is concentrically secured to the end of an axially reciprocatory rotary cam 111.

The cam 111 is arranged in operative engagement with a follower element 122, which is oscillatorily mounted by the brackets 114 on the support 23. The follower element 115 at the other end of the rocker arm is positioned in sliding engagement with an annular collar 116 secured to shaft 41. This collar also engages with the follower 117 at one end of another rocker arm 118, also mounted on the support 23 by means of the brackets 119 so as to position a follower element 120 at the other end of the rocker arm in operative engagement with an annular collar 121 secured to shaft 45.

A follower element 122 on the opposite side of rocker arm 113 from the follower 112 is positioned in operative engagement with annular collar 123 on shaft 51. Shafts 41, 45 and 51 have splined connections with their respective driving gears 103, 101 and 99, and are axially slidable in their respective journal mountings, and therefore rotation of the cam 111 causes continuous reciprocatory axial movement of these shafts (and their respective vibrating drums 40, 44 and 50) during their rotation under hte influence of the rocker arms 113 and 118.

The gear 110 drives a pinion gear 124 on a shaft 125 mounted between the supports 23 and 24, which also has another pinion gear 126, which drives a further gear 127 mounted on the end of a stub shaft 128 rotatably supported by pedestal 129 projecting inwardly from the support 24. Secured to the outer base of the gear 127 is a generally cylindrical head portion 130 provided with a radially directed cam portion 131 and having in its outer face a diametrically extending undercut slot 132. A slidable tongue member 133 provided with a laterally projecting crank pin 134 is received within the slot and may be adjustably positioned therein to vary the radius of the path of movement of the crank pin. The pin 134 is connected with one end of an arm 135, the other end of which is pivotally connected at 136 with the end of another arm 137; the other end of which arm is secured to the driving portion of a one-way clutch mechanism 138, the driven portion of which is connected with the shaft 30 of the fountain roller 31.

It will thus be seen that rotation of the gear 127 during operation of the ink feeder mechanism will produce intermittent unidirectional rotation of the fountain roller, and that the extent of angular movement of the roller during each cycle of rotation may be adjusted by changing the radial position of the crank pin 134, this being accomplished by slidable movement of the tongue 133.

Turning to FIG. 10, it will be seen that a bell crank lever 139 is secured to the end of shaft 59 which, in turn, supports the ductor roller shaft 35. One arm of the bell crank lever supports an extension arm 141 secured to it as by means of the bolts 142. These bolts are received through longitudinally extending slots 143 in the extension arm. A cam follower member 144 is carried at the outer end of this latter arm for operative engagement with the radial cam 131 under the influence of a tension spring 145 attached to the end of the other arm 146 of the bell crank lever.

It will be evident that rotation of the gear 127 with its associated cam 131 will thereby cause the ductor roller 34 to oscillate bodily in a generally horizontal plane for alternative intermittent contact between the fountain roller 31 and the fixed steel roller 36, and that the extent of travel between its extreme positions may be regulated by adjustment of the position of the extension arm 141 with respect to the bell crank arm 140. In adidtion, each of the brackets 58 is positioned on the shaft 59 by means of a base 147 having a slotted opening 148 to receive a bolt 149 which connects the brackets to the base to permit adjustable positioning of the brackets in a direction generally parallel with the oscillatory movement of the shaft 35. Thus, not only can the length of "throw" of the bell crank lever be adjusted by means of the extension arm 141, but also the relative pressure of the ductor roller against the fountain roller and the fixed steel roller may also be adjusted by shifting the brackets 58.

The plate cylinder assembly 150, as will be seen in detail in FIGS. 12 and 13a, comprises a generally cylindrical casting 151 having a heavy radial web 152 at its rear end provided with a concentric opening 153, which accurately centers that end of the cylinder on the plate cylinder shaft 91. The forward end of the cylinder is also provided with a radially extending web 154 having a somewhat larger concentric opening 155 to removably receive an axially slidable hub 156, provided at its outer extremity with a radially extending flange 157.

The hub is also provided with an internal bore 158 which fits slidably on the end of shaft 91 to position the front end of the cylinder concentrically about the shaft. The bore in the hub is also provided with a single longitudinally extending rib 159 which slidably engages within a keyway 160 at the forward end of the shaft to accurately position the cylinder angularly with respect to the shaft, as will be explained later.

The hub is secured to the cylinder by means of cap screws 161 which pass through openings 162 in the flange 157 and are threadedly received in the web 154 for clamping the flange to the web. The openings 162 are purposely made somewhat larger in diameter than the diameter of the shanks of the cap screws to permit a certain limited amount of relative rotation between the hub and the cylinder itself. This relative rotary movement may be adjusted (when the cap screws have been loosened) by means which include a stud 163 rotatably supported in the forward web 154 to project through a generally oval-shaped aperture 164 in the flange 157.

The stud is also provided with an eccentric camming surface 165 which bears against the aperture, whereby rotation of the stud will change the relative angular positions of the hub and the cylinder. The stud may be secured in place by means of a removable plate 166, which overlies the front side of the cam. Precise angular adjustment is facilitated by means of the cooperating vernier scales 167 and 168, the former being affixed to the web 154 while the latter is attached to the relatively rotatable flange 157.

The cylinder 151 is secured on the shaft in an endwise direction by means of a heavy adjustment washer 169 and an additional end washer 170, both of which are removably secured to the flat end surface 91a of shaft 91 by means of a heavy cap screw 171.

Cap screws 172, slidably received in suitable openings provided in washer 169, are threadedly secured in the flange 157 of the hub, while the set screws 173 are threadedly received in the adjustment washer 169 so that their inner ends merely abut against the end surface of the flange 157. It will thus be seen that if the set screws are turned in a direction to withdraw them towards the left in FIG. 12, and thereafter if the cap screws are turned in a direction to tighen them, the entire cylinder 151 will be moved along the shaft towards the left until the end flange finally abuts against one or more of the withdrawn set screws. Similarly, if it is desired to move the cylinder towards the right, it will only be necessary to loosen the cap screws and to correspondingly tighten the set screws.

The periphery of the cylinder 151 is provided with a pair of angularly spaced longitudinally extending recesses 174 and 174a to adjustably receive the plate-holding clamps 175 and 175a, which extend across substantially the entire width of the cylinder. Formed on the back of each of these clamps are one or more rearwardly disposed axially extending tongue members 176 and 176a which are slidably received in complementary dovetailed slideways 177 and 177a, extending transversely in the bottom face of the recesses. The clamps are also provided with one or more transversely directed threaded openings into which are threaded the adjusting bolts 178 and 178a, the length of these bolts being substantially equal to the width of the recesses within which they are received.

Clamping strips 179 and 179a are adjustably secured to the tops of the respective clamps as by means of the recess cap screws 180 and 180a, whereby the respective ends of the usual sheet metal printing plate, indicated generally by the numeral 181, may be adjustably secured to the cylinder.

The cylinder 151 may also be chamfered as at 182 and 182a to permit the plate to be led into the clamps without subjecting it to excessive bending. It will also be observed that with this arrangement, after the ends of the plate have been clamped between the clamps 175 and 175a, and their respective clamping strips 179 and 179a, the tension on the plate may be increased or decreased by suitable adjustment of either set of adjusting bolts 178 or 178a; the other set of bolts being undisturbed. In addition, it will be realized that by suitable adjustment of both sets of bolts, the entire plate 181 may be shifted circumferentially with respect to the surface of the cylinder 151.

The preregistering operation is performed by means of a preregistering jig shown in FIGS. 4 and 12. This mechanism is supported upon a flat base 183 having a pedestal 184 mounted midway between the ends at one side which solidly supports a horizontally extending cylindrical fixed arbor 185, which is a precisely machined duplicate of the plate cylinder shaft 91, including the provision of a keyway 186 at its free end corresponding to the keyway 160 in the shaft.

Positioned at opposite ends of the base are a pair of optical microscopes, indicated generally by the numerals 187 and 187a, comprising horizontal lens tubes 188 and 188a, supported on vertical mountings 189 and 189a projecting upwardly from sub-bases 190 and 190a to position the axes of the lens tubes in horizontal alignment with each other and with the axes of the arbor 185, but at right angles thereto.

The forward ends of the lens tubes are provided with illuminated reticles 191 and 191a which preferably may comprise a conventional pair of cross-hairs (not shown) while the rear ends support the upwardly directed eye pieces 192 and 192a. When the preregistering jig is in use, the reticles are positioned closely adjacent the cylinder being registered, as shown in FIG. 4, but the sub-bases 190 and 191 are attached to the principal base 183 by vertically mounted pins 193 and 193a which permit the microscope assemblies each to be swung outwardly and away from the cylinder assembly when it is to be inserted upon or removed from the arbor. Stops 194 and 194a are provided to limit the inward movement of the microscopes and their correct positioning is further assured by means of spring-biased vertical plungers 195 and 195a which seat in suitably positioned recesses provided in the base 183.

Before describing the use of the preregistering jig, it should be pointed out that when the printing plates 181 are being prepared in the photoengraving room, they are provided at opposite ends with visual reference marks in the form of cross-lines 196 and 196a and, if several color separation plates are being made for a single composite design, or if the material on several plates is to be correlated one with the other, the image, indicated generally by the numeral 197, produced on each plate is precisely related to the reference marks 196 and 196a so that the composite of the images will be in registry when transferred to the printing blanket.

The plate 181 can best be preliminarily attached to the cylinder 151 after the cylinder has been placed upon the arbor 185 with the hub 156 having its rib 159 received in the keyway 186 and the washers 169 and 170 secured by the cap screw 171. The cap screws 161 may then be loosened and the stud 163 is turned by a suitable tool to rotate the cam 165 until the circumferential adjustment verniers 167 and 168 are moved into their zero position, after which the cap screws are tightened. At this point, it may be noted that the vernier scales are arranged to read from both sides of a central position in order to permit slight angular adjustment in either direction from a zero mid-point.

The cap screws 172 and set screws 173 are then preferably set at approximately their mid positions so that any necessary axial adjustment of the cylinder may be made in either direction. Similarly, the clamps 175 and 175a may be put in their mid positions by means of the adjusting bolts 178, after which the plate is wrapped around the lower half of the cylinder and its respective ends inserted under the loosened clamping strips 179 and 179a.

The microscopes 187 and 187a are swung inwardly against the stops 194 and 194a and locked in place by the plungers 195 and 195a. Preliminary coarse adjustment of the plate may be made by sighting through the respective eyepieces 192 and 192a to view the positions of the cross-marks 196 and 196a. This coarse adjustment having been attained, the clamping strips 179 and 179a can be secured by tightening the recessed cap screws 180 and 180a. If the printing plate cannot be precisely aligned so that the indicia marks 196 and 196a are in alignment with the reticles in both of the microscopes before the strips 179 and 179a are clamped by hand; precise alignment can be obtained by angular shifting of the cylinder 151 with respect to the arbor 185, by loosening the cap screws 161 and rotation of the cam surface 165 as previously explained, and the axial alignment may be obtained by using the adjustment provided by the cap screws 172 and set screws 173, as previously explained.

When final adjustments have thus been made, it will then be understood that the printing plate 181 will be positioned on the cylinder so that reference marks 196 and 196a will be positioned at a precise predetermined axial distance from the flat end of the arbor 185, and these marks will also be arranged in a precise angular relationship with respect to the keyway 186 of the arbor. Consequently, since the arbor is an exact reproduction of the plate cylinder shaft provided on each of the inker feed mechanisms, when the plate cylinder 151 is removed from the arbor and thereafter placed on a shaft 91 of any one of the ink feeder mechanisms 20a, 20b, 20c or 20d, as shown in FIG. 1, the indicia marks on the printing plate will have to be positioned at the same axial distance from the flat end 91a of any one of the plate cylinder shafts, and will aso be angularly related to the keyways 160 an identical amount regardless of which ink feeder the cylinder is placed upon.

The arrangement by which the printing plate 181 of any one of the inker mechanisms will be caused to produce an impression on the printing blanket 18 in exact registry with the printing plates of the other inker mechanisms will now be described.

Turning to FIGS. 7 and 8, it will be seen that one end of the cylindrical brace 25 extends forwardly from the support 22 (that is, to the left in FIG. 7) where it is removably supported by an upwardly projecting fork 198, which forms a part of the main framework of the press mechanism. Similarly, in FIG. 8, it will be seen that the member 25 extends rearwardly from the support 24 where it is removably supported in another fork 199 forming a part of the other side of the press mechanism.

The upper ends of the forks are provided with removable straps 200 and 201 to secure the inker mechanism in place. As seen in FIG. 1, the forks 198a, 198b, 198c and 198d, together with the respective forks (not shown) for supporting the other end of the ink feeder, are arranged so that they position the respective cylindrical braces 25 of each of the inkers so that they lie in the plane of a cylinder concentric with the surface of the printing blanket 18 and equally spaced from each other in parallelism about the circumference of this imaginary plane. The forks are also arranged so that their inside faces are all disposed in alignment with each other and at a fixed distance axially from the center line of the blanket.

To insure alignment of the inker mechanisms, a tapered locating collar 202 surrounds the support 25 on its front face as seen in FIG. 7, and another locating collar 203 is provided at the rear end as shown in FIG. 8. These collars may be ground down, or shimmed up, as the case may be, to fit snugly between the forks 198 and 199 and to insure that the flat front surface 91a of the plate cylinder shaft 91 will be positioned at a predetermined axial distance from the center line of the blanket 18.

Thus, it will be seen that when the plate cylinders carrying their impression plates, which have been adjusted by the previously described pre-register technique, have been assembled on the ink feeding mechanisms, all of the printing plates will automatically be aligned with respect to lateral registry, regardless of which pair of forks on the press each particular inker mechanism happens to occupy.

Contact pressure between an impression plate and the printing blanket may be regulated by an arm 204, which is rigidly secured at the front extremity of the brace 25 to extend downwardly between a pair of oppositely disposed adjusting screws 205 and 206. By taking up on one or the other of these screws, and at the same time backing off the other screw, the entire inker will be rotated about the axis of the brace 25, which rotation will move the axis of the plate cylinder shaft 91 toward and away from the printing blanket.

The aforementioned pressure adjustment apparatus is described and claimed in my copending application, Ser. No. 489,456, filed Aug. 19, 1965.

Longitudinal registry of the impression plates is automatically accomplished in a manner which will now be described.

First, it will be realized that when any one of the inker units is lowered into position on the press, as the supporting member 25 seats upon the supporting forks 198 and 199, at the same time, the gear 96 of that unit will come into contact with, and mesh with the large gear 97, which turns in synchronism with the printing roll 18. Further, the diameter of driving gear 97 is such that the points of tangency between this gear and the gears 96 of the inkers will lie along a circle having the same diameter as that of the blanket 18.

Turning now to FIG. 14, it will be realized that if the distance along the circumference of the large gear 97 between the points of tangency with the gears 96a, 96b, 96c and 96d, was in each case exactly equal to the circumference of these gears, then all that would be necessary to secure perfect registration in a longitudinal direction would be to set the printing plates of each inker in the same relative angular position before putting each inker on the press, since the circumferential distance on the blanket between each impression produced by each inker would be equal to one revolution of the plate cylinders. However, in order to conserve space, the distance between inkers may be reduced and in the present embodiment of the invention, the distance between the points of tangency between the impression plates and the printing roll is less than the circumference of a single plate, and means has been provided to compensate for this discrepancy in setting up the inker prior to positioning it on the press.

Such means includes the provision of a pointer 207 attached to the support 24 adjacent the protruding extremity of shaft 91 and the circumference of this shaft is provided with accurately positioned index marks 208a, 208b, 208c and 208d, which marks correspond to the proper position of the shaft for each of the four positions in which the inker unit may be placed upon the press.

Turning again to FIG. 14, the relative position of the keyway 160 of each of the plate cylinder shafts will be observed when all of the inker units have been assembled. For example, the shaft of gear 96a will be positioned so that the index mark 208a is in alignment with the pointer 207; the shaft for gear 96b will have its mark 208b positioned in alignment with the pointer; the shaft for gear 96d is arranged with the mark 208c adjacent the pointer, and the shaft for gear 96d is set with mark 208d aligned with the pointer. Obviously, if one of the inker units is shifted to another position, the plate cylinder shaft need only be set at its proper index mark corresponding to that position prior to assembly on the press.

One of the advantages of this arrangement is that additional inker units for later press "runs" may be set up and preregistered during operation of the press. In fact, an entire set of inker units may be prepared in advance so that as soon as a run on the press has been completed on one set of plates, a complete new set of plates for a different press run can be substituted in a matter of minutes so that substantially continuous operation of the press may be accomplished with relatively little lost time for changing ink colors or impression plates which normally must be done on the press while stopped.

For convenience in setting up an inker unit, a set-up stand is shown in FIG. 5, which includes a heavy flat base 209 provided with a fork 210 to support one end of the member 25 and having another fork (not shown) to support the other end. The stand is also provided with stops 211 to receive the lower end of the arm 204 to maintain the inker unit in an upright position. An electric motor 212 provided with a speed-reducing mechanism to drive a pinion 213 is mounted on the base to position the pinion in driving engagement with the gear 94. This arrangement permits the various adjustments to be made in the distributor rollers and vibrating drums and to set the proper angular position for the plate cylinder shaft prior to positioning the inker unit on the press.

An additional feature of the invention comprises means to stop delivery of ink to the impression cylinder if for any reason this should be desirable during operation of the press; as for example, if there should be a halt or other stoppage in the delivery of articles to be printed. For this purpose, an arm 214 is mounted on a pivot 215 below the arm 140 of the bell crank lever shown in FIG. 10. The free end of this arm is connected with the armature of an electric solenoid 216 so that when the solenoid is energized, a slight counterclockwise movement will be imparted to the arm. The arm is also provided adjacent the pivot with an upwardly projecting dog 217 which is normally positioned to clear the downward movement of the projection 218 on the lower side of the arm 140, during reciprocatory movement of this arm. However, if for any reason it is desired to prevent the ductor roller from picking up ink from the fountain roller, the solenoid 216 may be energized to urge the dog 217 in a counterclockwise position underneath the projection 218, in which position, the downward movement of the bell crank arm 140 will be prevented and further transfer of ink will be stopped until such time as the solenoid is deenergized and the dog returned to its normal position as shown in FIG. 10.

This solenoid may be operated automatically by the expedient of placing a feeler mechanism adjacent the articles being fed to the printing blanket. This feeler mechanism may include a switch connected in the circuit with the solenoid; the feeler mechanism maintaining the switch in operative position so long as articles are being fed, but closing the switch to actuate this solenoid in the absence of an article on the delivery mechanism.

Having shown and described a preferred form in which the present invention may be embodied, it will be apparent to those skilled in the art that various modifications and improvements may be made in the construction and practice of the invention which will come within the scope of the annexed claims.

I claim:

1. In a plate cylinder for multicolor presses having preregistry means associated therewith of the type wherein the press includes a shaft having fixed circumferential and axial locating stop means for removably supporting a plate cylinder mounting means thereon in predetermined fixed axial and circumferential relationship thereto and the preregistry means includes a duplicate of said shaft including said fixed circumferential and axial locating stop means for removably supporting a plate cylinder for preregistry adjustment axially and circumferentially, said plate cylinder mounting means including a plate holding portion and a hub portion, said hub portion including washer means for fixed attachment to the end of a shaft and a sleeve axially adjustably movable with respect to said cap and also movable circumferentially with respect to said plate holding portion, threaded adjustment means connecting said washer means and sleeve for said axial adjustment and clamping adjustment means connecting said sleeve and plate holding portion for said circumferential adjustment.

2. The invention as defined in claim 1, wherein said clamping adjustment means includes camming means for varying the relative circumferential relationship between said sleeve and the plate holding portion.

References Cited

UNITED STATES PATENTS

| | | | |
|---|---|---|---|
| 637,563 | 11/1899 | Hett | 29—123 |
| 1,949,668 | 3/1934 | Kranz | 101—375 |
| 2,417,496 | 3/1947 | Huebner | 33—184.5 |
| 2,668,363 | 2/1954 | Lippitt | 33—184.5 |
| 2,683,994 | 7/1954 | Whitfield | 287—53 |
| 3,112,941 | 12/1963 | Dutton | 287—53 |

ROBERT E. PULFREY, *Primary Examiner.*

F. A. WINANS, *Assistant Examiner.*